United States Patent
Wan et al.

(10) Patent No.: US 9,001,728 B2
(45) Date of Patent: Apr. 7, 2015

(54) DATA TRANSMISSION ACROSS INDEPENDENT STREAMS

(75) Inventors: Wade Wan, Orange, CA (US); Rajesh Mamidwar, San Diego, CA (US); Xuemin Chen, Rancho Sante Fe, CA (US); Marcus Kellerman, Poway, CA (US); Brett Tischler, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 314 days.

(21) Appl. No.: 13/566,254

(22) Filed: Aug. 3, 2012

(65) Prior Publication Data

US 2013/0033642 A1 Feb. 7, 2013

Related U.S. Application Data

(60) Provisional application No. 61/515,543, filed on Aug. 5, 2011.

(51) Int. Cl.
*H04B 7/212* (2006.01)
*H04N 21/462* (2011.01)
*H04N 21/2343* (2011.01)
*H04N 21/236* (2011.01)
*H04N 19/39* (2014.01)

(52) U.S. Cl.
CPC ... *H04N 21/4622* (2013.01); *H04N 21/234327* (2013.01); *H04N 21/23602* (2013.01); *H04N 19/39* (2013.01)

(58) Field of Classification Search
CPC ............ H04N 1/4382; H04N 21/2383; H04N 21/41407; H04L 1/0065; H04L 1/0071
See application file for complete search history.

(56) References Cited

U.S. PATENT DOCUMENTS

| | | | |
|---|---|---|---|
| 2002/0136406 A1* | 9/2002 | Fitzhardinge et al. | 380/210 |
| 2006/0130113 A1* | 6/2006 | Carlucci et al. | 725/118 |
| 2009/0052323 A1* | 2/2009 | Breynaert et al. | 370/235 |
| 2012/0023535 A1* | 1/2012 | Brooks | 725/110 |
| 2012/0092453 A1* | 4/2012 | Suh | 348/43 |

* cited by examiner

*Primary Examiner* — Jung Park
(74) *Attorney, Agent, or Firm* — Foley & Lardner LLP

(57) ABSTRACT

Various systems and methods are provided for transmission of related data components across independent streams. In one embodiment, among others, a transmitting device may separate transmission data into related data components and transmit each related data component in an associated transport stream. Each related data component includes a synchronization tag associated with synchronization of the related data component within the transmission data. In another embodiment, a receiving device may receive related data components transmitted in separate transport streams and decode the related data components based at least in part upon a synchronization tag included in each related data component. In another embodiment, among others, a method for includes receiving data components transmitted on a plurality of transport streams, separating related data components from unrelated data components in the transport streams based at least in part upon a synchronization tag of each related data component; and decoding the related data components.

19 Claims, 7 Drawing Sheets

DATA TRANSMISSION ACROSS INDEPENDENT STREAMS

CROSS REFERENCE TO RELATED APPLICATIONS

This application claims priority to U.S. provisional application entitled "DATA TRANSMISSION ACROSS INDEPENDENT STREAMS" having Ser. No. 61/515,543, filed Aug. 5, 2011, the entirety of which is hereby incorporated by reference.

BACKGROUND

Transmission of program data is typically carried out over a single common layer. For example, audio and video content for the program is carried over the same transport stream. The program data is synchronized within the same transport stream. In many cases, data for multiple programs is multiplexed for transport in a single stream. The modulation of the transport stream is often optimized for the programs being transmitted.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
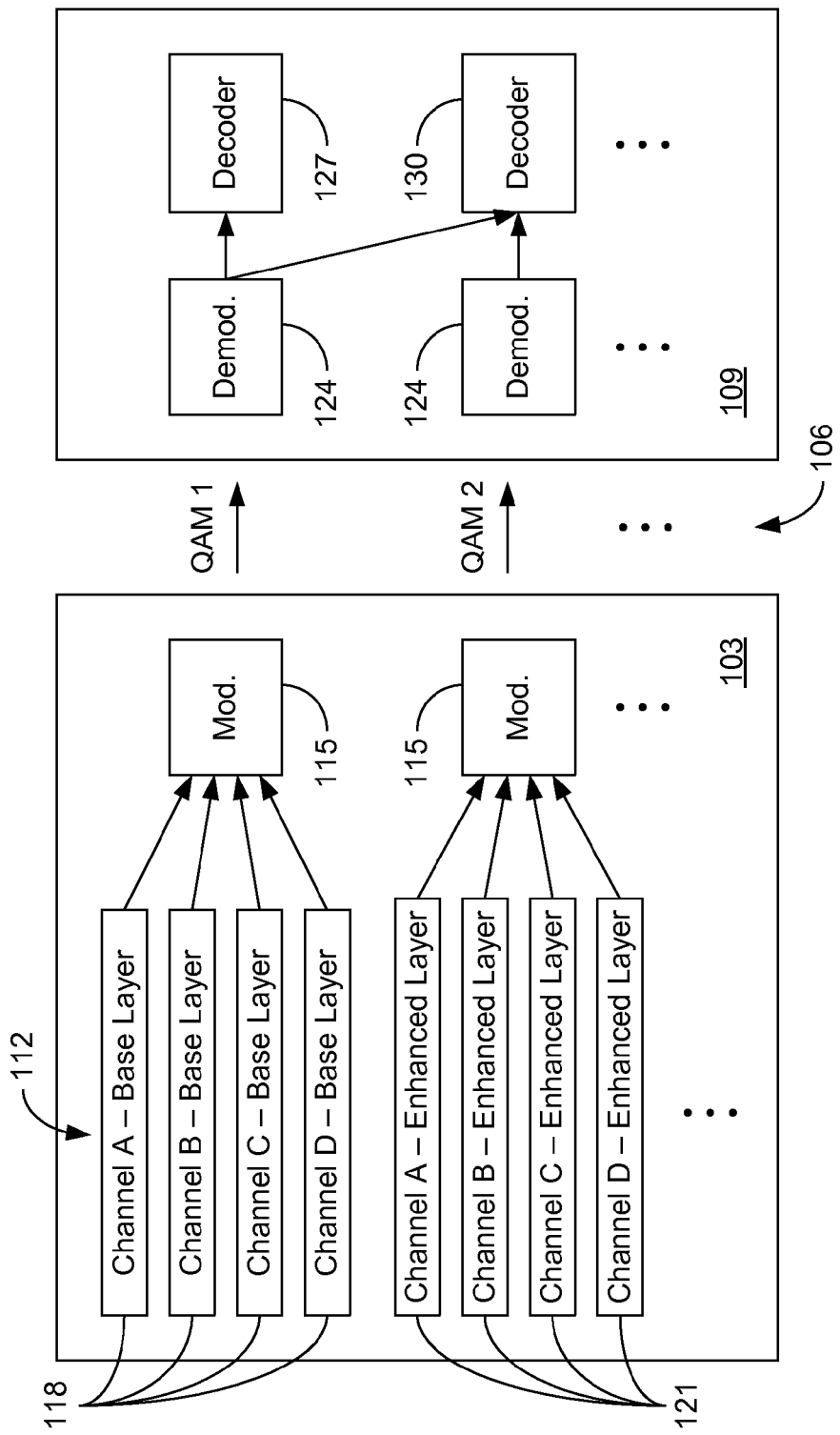
FIGS. 1 and 2 are graphical representations of examples of systems for transmission of related data components across independent streams in accordance with various embodiments of the present disclosure.

Disclosed herein are various embodiments of methods related to transmission of related data components across independent streams. Reference will now be made in detail to the description of the embodiments as illustrated in the drawings, wherein like reference numbers indicate like parts throughout the several views.

Transmission is typically performed over a single bitstream that carries all of the data associated with a channel or a source. For example, six high definition (HD) channels may be carried over the same layer using a quadrature amplitude modulation (QAM) that has been optimized for the existing data. However, the data may be separated into components that may be transmitted over different bitstreams and recombined after receipt. For example, related data such as audio, video, and/or other content (e.g., channel guides, closed captioning, encryption information, etc.) may be separated and transmitted on independent transport streams. In some cases, additional information may be included to enhance some or all of the existing channels. Enhanced information or services may be transmitted over an independent stream without modifying the modulation (e.g., QAM) of the existing transport stream. This may be applied to layered coding techniques such as, e.g., scalable video coding (SVC) where different temporal, spatial, and/or quality resolutions may be transported in separate layers. The separate data components may then be recombined for processing at the receiving end.

Referring to FIG. 1, shown is an example of a system for transmission of related data components across independent streams. In the example of FIG. 1, a transmitting device 103 (e.g., a transmitter or transceiver) sends one or more streams 106 of data to a receiving device 109 (e.g., a receiver or transceiver). The transmitting device 103 may comprise suitable circuitry that may include, e.g., processor(s), application specific hardware (ASIC), interfaces and/or other components as well as code executed by hardware included in the circuitry (e.g., a processor) that may be configured to receive, process, and distribute data to the receiving device 109 via a bitstream such as the transport stream 106. The transmitting device 103, which may be included in a headend system, may be configured to provide various services such as, e.g., distribution, multicast, and/or quality of service for reliable and timely transmission of the data to the receiving device 109. The transmitting device 103 may utilize, for example, a cable TV network, a satellite broadcasting network, the Internet protocol (IP) data network such as the Internet, and/or a wireless communication network for delivery of the data to the receiving device 109.

Data from multiple channels 112 may be combined and modulated 115 for transmission through a common transport stream (e.g., QAM 1) 106. In this way, data components related to a channel and data components that are unrelated to the chancel (e.g., data components related to another channel) may be sent via the same transport stream 106. In some cases, information from a channel 112 may be separated for transmission over N different transport streams 106. For instance, in multi-tiered video coding such as SVC, the data may be separated into a base layer component 118 and an enhancement layer component 121. The base layer component 118 may be used to produce, e.g., standard or HD video using legacy decoders. The enhanced layer component 121 can include additional information that, when combined with information in the base layer component 118, may be used by more advanced (or enhanced) decoders to produce enhanced video for display. For example, the base layer component 118 may include channel information to support decoding of a 1080p24 HD video. In some embodiments, the enhancement layer component 121 may include additional channel information to support decoding the HD video at a higher resolution such as, e.g., 2K×4K. In other embodiments, the enhancement layer component 121 may include additional channel information to support decoding the HD video at a different rate or format such as, e.g., 1080p60 or 1080p120. In either case, there may be multiple enhancement layers to support different display rates or resolutions. For instance, the base layer component 118 may support decoding at 1080p24, a first enhancement layer component may allow decoding at 1080p60 or 1080i60, and a second enhancement layer component (not shown) may allow decoding at 1080p120 or 1080i120. These first and second enhancement layer components may be transmitted in the same or different transport streams 106.

The enhancement layer components 121 may also include content other than audio and/or video information. For instance, an enhancement layer component 121 may include guide information that may be associated with that specific channel or may be associated with multiple channels. If the guide information is associated with multiple channels, then a single enhancement layer component 121 including the guide information may be associated with each of the base layer components 118 for the channels. In other implementations, the enhancement layer components 118 may include mosaic information associated with the base layer 118. For instance, the mosaic information may include a miniature video (e.g., a network icon, program advertisement, or information streamer) that may be decoded at the same time as the video content in the base layer component 118 and rendered over the base layer video. Mosaic information may also include multiple small video components that may be decoded at the same time and recombined for display. In other implementations, enhancement layer components may include information for multiple small videos that may be transported across multiple streams. The base layer and enhancement layer components may be decoded at the same time to provide the video output. Other implementations may include one or more encryption keys or other encryption information in the enhancement layer component(s) 121.

In FIG. 1, the base layer components 118 of four channels (A-D) are combined and modulated 115 in the transmitting device 103 before being sent in a first transport stream (e.g., QAM 1) 106. In other embodiments, data components from more or fewer channels may be combined for a transport stream 106. Corresponding enhancement layer components 121 of the four channels (A-D) are also combined and modulated 115 in the transmitting device 103 before being sent in a second transport stream (e.g., QAM 2) 106. While QAM is illustrated for the transport streams 106 of FIG. 1, other modulation schemes may also be utilized. The transport streams 106 are received and demodulated 124 by the receiving device 109. The receiving device 109 may comprise suitable circuitry that may include, e.g., processor(s), application specific hardware (ASIC), interfaces and/or other components as well as code executed by hardware included in the circuitry (e.g., a processor) that may be configured to receive and process the data components from the transmitting device 103 via a bitstream such as the transport stream 106.

In the example of FIG. 1, the receiving device 109 (e.g., a set-top box (STB)) is configured demodulate 124 the received transport stream(s) and provide the appropriate data components to decoders 127 and/or 130 for decoding. For example, a legacy decoder 127 may only be able to decode content in the base layer component 118, while a newer enhanced decoder 130 may be able to decode higher level or enhanced content in the enhancement layer components 121. If only the basic HD video of a channel is desired, the base layer component 118 can be decoded by a legacy decoder 127 and the enhanced layer component 121 may be ignored. However, if enhanced video is desired, then the base layer component 118 and the enhanced layer component 121 are provided to a more advanced (or enhanced) decoder 130 for decoding. In some implementations, an enhanced layer component 121 may be provided to a plurality of decoders for use in decoding. The demodulation 124 may also allow concurrent demodulation of multiple channels in a transport stream 103 and provision of the demodulated data components to different decoders for decoding.

The separated components are recombined at the receiving end. Synchronization of the component data is needed to ensure proper decoding. For example, separating SVC components across different QAM transport streams can introduce issues such as, e.g., synchronization deviations across the different transport streams, properly defined encryption, guide, and mosaic information or data to allow for use of different streams when they typically are in the same stream, etc. The transport streams are demodulated and the demodulated components synchronized. Synchronization of the data components may be accomplished using one or more synchronization tags including, e.g., timestamps and/or frame numbers. Formatting of the component data may also provide information that may be used for synchronization of the data components obtained from the separate streams.

Figure 2:
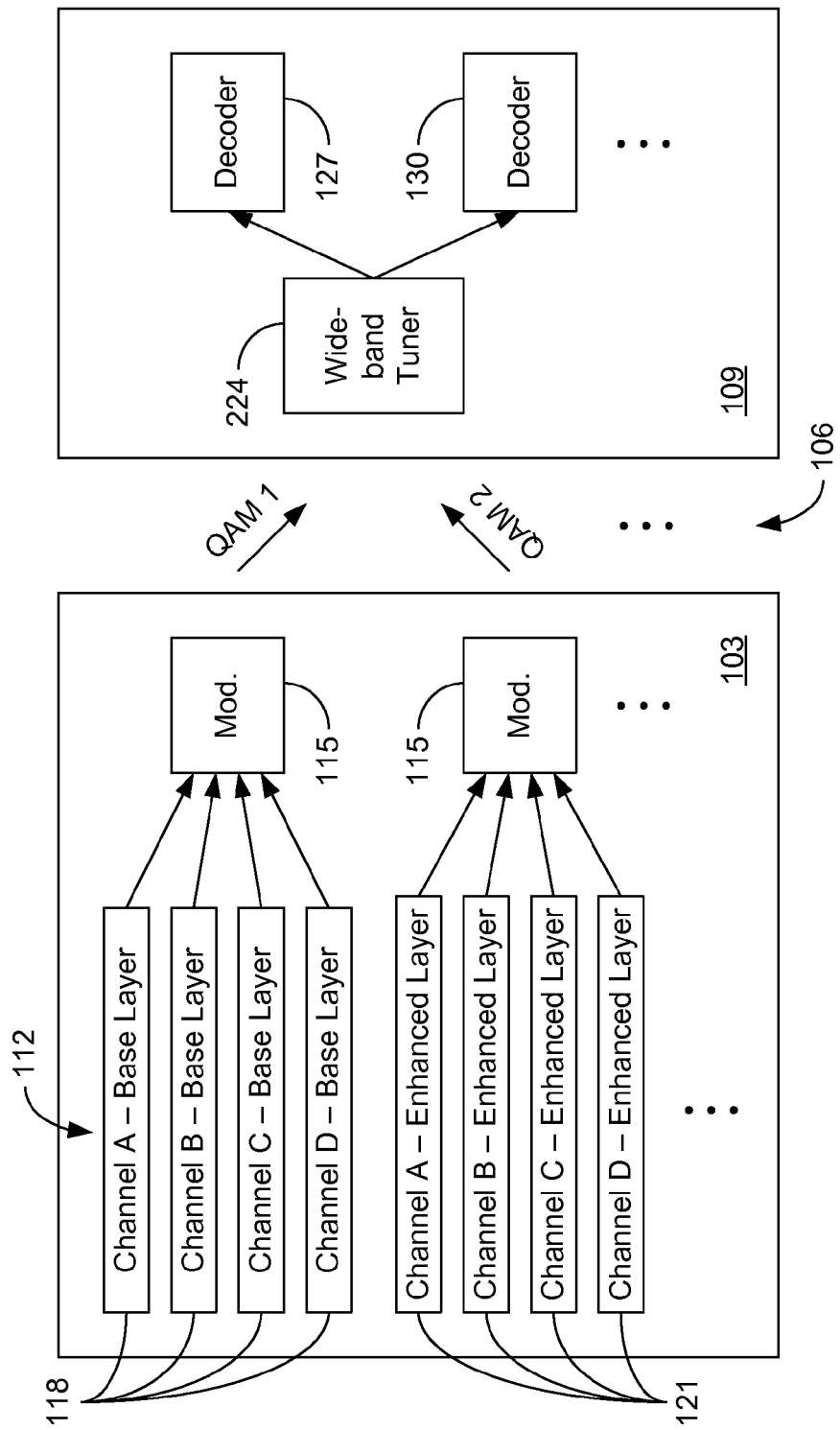

Referring to FIG. 2, shown is another example of a system for transmission of related data components across independent streams. As in FIG. 1, the data components are sent to the receiving device 109 through a plurality of transport streams 106. In the example of FIG. 2, a wideband tuner 224 demodulates components from multiple transport streams and distributes the information from one or more streams to the appropriate decoder(s) 127 and/or 130, e.g., based upon its capabilities. The wideband tuner 224 may be configured to combine the base and enhanced components before distributing the content to the appropriate decoder. This distribution of channel content allows simultaneous decoding by different decoders.

Figure 3:
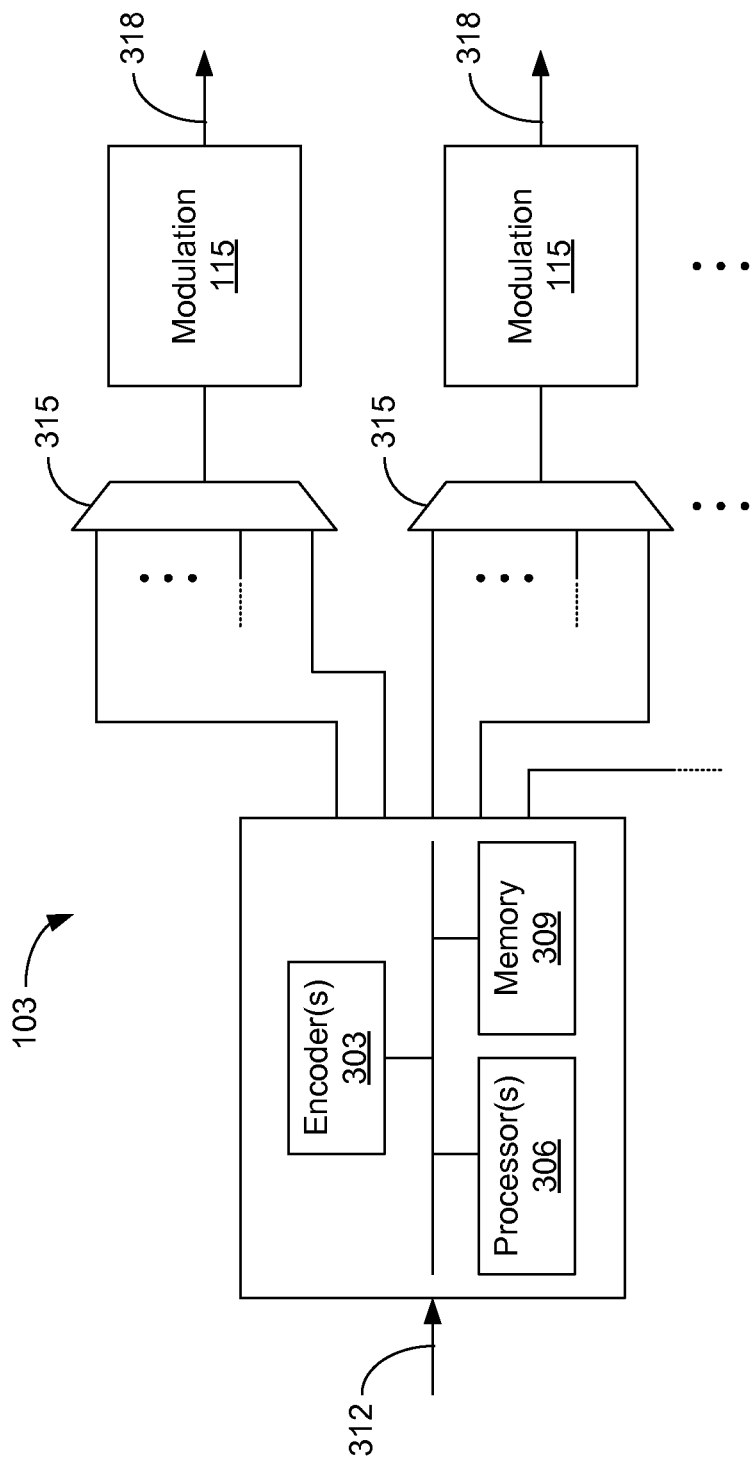
FIG. 3 is a graphical representation of an example of a transmitting device of FIGS. 1 and 2 in accordance with various embodiments of the present disclosure.

Referring next to FIG. 3, shown is an example of a transmitting device 103 for transmission of related data components across independent streams 106. The transmitting device 103 comprises suitable circuitry that may include, e.g., encoder(s) 303, processor(s) 306, memory 309, application specific hardware (ASIC), interfaces, and/or other components as well as code executed by hardware included in the circuitry (e.g., a processor) that may be configured to process the data before modulation and transmission of the data components via one or more transport streams 106. The transmitting device 103 receives data 312 such as audio, video, and/or other content (e.g., channel guides, closed captioning, encryption information, etc.) for transmission and separates the received data 312 into related data components for transmission through the one or more transport streams 106. The transmitting device 103 receives the transmission data 312 and separates the received data 312 into data components. For example, the encoder 303 may be configured to encode the received data 312 into a SVC base layer component and one or more SVC enhancement layer components. Other data components such as, e.g., guide information may be received by the transmitting device 103 as separate data 312. In other embodiments, mosaic information may be separated into different data components and sent through different transport streams 106.

The transmitting device 103 may also be configured add a synchronization tag to the separated data components that may be used for synchronization of related components that are sent via different streams 106. For example, the synchronization tag may be placed in a predefined location in the header information of the data components. The synchronization tag may include a time stamp that may be used for synchronization of the separated data components. For example, the program clock reference (PCR) for each transport stream 106 may be used for synchronization. The PCR for the different streams 106 may be synchronized by the transmitting device 103 and a time stamp corresponding to the synchronized PCRs may be added to each of the separated components. In other implementations, the clocks may not be synchronized. For example, the PCR associated with the base layer component may be used as the master clock and offset corrections may be determined by the transmitting device 103 for the PCRs associated with the other streams 106. The offset correction value may be included in the synchronization tag of the data component corresponding to the transport stream 106. The differences in the PCRs may then be compensated using the offset correction values when the transmitted data components are received in the receiving device 109.

In some embodiments, the synchronization tag includes a frame identifier in the separated data components to indicate the relationship between the different components. In some implementations, the frame identifiers comprise a corresponding frame number and/or a channel or program identifier. In some cases, the channel or program identifier may be stored in a program association table or a program mapping table in the transmitting device 103 and the receiving device 109. Where a data component is related to a plurality of other components (e.g., guide information that may be related to multiple channels or encryption keys that may be used to decrypt the base layer component and the corresponding enhancement layer components), the frame identifier of the common data component (e.g., guide or encryption information) may include an identification code that may be used to determine its association with each of the other data components. The identification code may be included in the other data components or may include information that may be used to determine the other data components. For example, the identification code may indicate which of the other transport streams 106 include the related data components. When the synchronizing tag does not include a time stamp or the time stamps may not be relied upon, then the information of the frame identifier may be used to synchronize the related data components.

The separated data components may then be sent to a plurality of multiplexers 315, which are configured to merge the data components for modulation 115 and transmission to the receiving device 109 via different transport streams 106. The transmitting device 103 may comprise suitable circuitry and/or code executed by hardware included in the circuitry (e.g., a processor) configured to merge and modulate the data components for transmission. The modulated data 318 is then transmitted to the receiving device 109 in the corresponding transport stream 106. As illustrated in the example of FIG. 1, a plurality of base layer components 118 are merged by a first multiplexer 315 for modulation 115 and transmission via a first transport stream (QAM 1) 106 and a plurality of enhanced layer components 121 are merged by a second multiplexer 315 for modulation 115 and transmission via a second transport stream (QAM 2) 106. While the example of FIG. 1 shows the base and enhanced layer components 118 and 121 being sent through separate streams 106, in other implementations a combination of base and enhanced layer components 118 and 121 may be merged by a multiplexer 314 for modulation 115 and transmission via a transport stream 106.

The modulation 115 of the transmitting device 103 may also include one or more buffer(s) to correct for slight differences between clock speeds of the modulation 115. In some implementations, the buffer(s) may be at the modulation output. In the ideal case, all of the modulation 115 is performed at the same clock speed so there is no long term drift. In reality, slight differences exist between the modulation speeds (e.g., modulation 115 associated with one transport stream 106 is running at 27 MHz and modulation 115 associated with another transport stream 106 is running at 27+Δ MHz) so that over time a long term drift across the transport streams 106 can occur. This may compromise the ability of the receiving device 109 to resynchronize the related data components for decoding using the synchronization tags.

Over time, the long term drift across the transport streams 106 results in a delay between the related data components that, no matter how large the buffers are at the receiving device 109, can eventually prevent matching the related data components for decoding. To compensate, the transmitting device 103 may utilize the modulation output buffer(s) and monitor the data flow across the transport streams 106. The transmitting device 103 may then adjust the flow over the streams 106 to keep the transmission of the related data components close to each other. For example, the transmitting device 103 may be configured to correct for the drift by adjusting the modulation rate by reducing (or increasing) the clock speed if more (or less) data is being modulated for transmission on the corresponding transport stream 106 compared to the other streams 106. For instance, the transmitting device 103 can monitor the condition of the modulation buffer(s) by, e.g., monitoring the buffer levels or the rate at which data is removed from the buffer(s) and adjusting the modulation rate accordingly.

Figure 4:
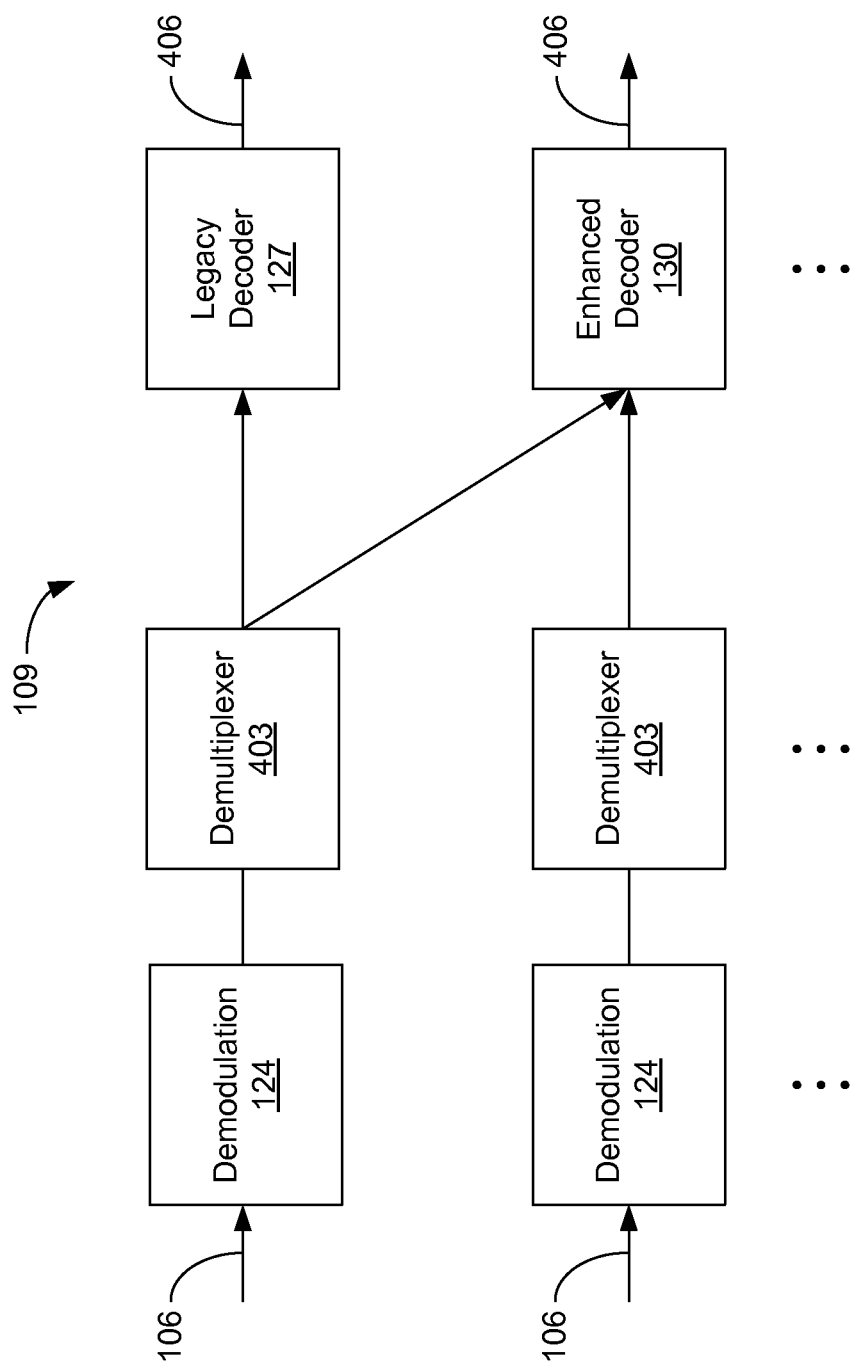
FIG. 4 is a graphical representation of an example of a receiving device of FIG. 1 in accordance with various embodiments of the present disclosure.

Referring to FIG. 4, shown is an example of a receiving device 109 of FIG. 1 for transmission of related data components across independent streams 106. The receiving device 109 comprises suitable circuitry that may include, e.g., decoder(s) 127 and 130, processor(s), memory, application specific hardware (ASIC), interfaces, and/or other components as well as code executed by hardware included in the circuitry (e.g., a processor) that may be configured to process the data components for decoding. The receiving device 109 receives and demodulates 124 each of the plurality of transport streams 106 including the data components. In the example of FIG. 4, each transport stream 106 is separately demodulated 124 before sending to a demultiplexer 403 to separate the different data components in the transport stream 106. The demultiplexer 403 may comprise suitable circuitry and/or code executed by hardware included in the circuitry (e.g., a processor) configured to separate the data components for decoding by the appropriated decoder 127 and/or 130.

The receiving device 109 is configured to identify related data components based at least in part upon the synchronization tag included in the data component. The synchronization tag may be obtained from the data components and used for the identification of related data components. For example, the program clock reference (PCR) for the different streams 106 may be synchronized by the transmitting device 103 and a time stamp corresponding to the synchronized PCRs may be included in each of the related data components. By comparing the time stamps of data components from different demultiplexers 403, the receiving device 109 may identify related data components with the same time stamp. In other implementations, the clocks for each transport steam 106 may not be synchronized. In that case, the transmitting device 103 may use the clock for one transport stream 106 as the master and provide offset corrections for the other clocks. For example, the PCR associated with the base layer component may be used as the master clock and offset corrections for the PCRs associated with the other streams 106 may be included in the corresponding data components. The receiving device 109 may use the offset correction value included in the synchronization tag of the data component and the PCR of the corresponding transport stream 106 to identify data components that are related.

In some embodiments, the synchronization tag includes a frame identifier in the data components to indicate the relationship between the components. The frame identifiers may comprise a corresponding frame number, a channel or program identifier, and/or other relationship information. The receiving device 109 may use the channel or program identifier to identify related data components. Where a data component is related to a plurality of other data components in different channels or to multiple data components in the same channel (e.g., guide information that may be related to multiple channels or encryption keys that may be used to decrypt the base layer component and the corresponding enhancement layer components), the frame identifier of the common data component (e.g., guide or encryption information) may include an identification code that may be used to determine its association with each of the other data components. The identification code may be included in the other data components or may include information that may be used to determine the other data components. For example, the identification code may indicate which of the other transport streams 106 include the related data components. In some cases, the receiving device 109 may include a program association table or a program mapping table that may be accessed by the receiving device 109 for identification of related data components. When the synchronizing tag does not include a time stamp or the time stamps may not be relied upon, then receiving device 109 may use information from the frame identifier to synchronize the related data components. For example, the frame identifier may include information such as, e.g., the number of related data components and/or an indication of the relationship between the related data components (e.g., base layer, enhancement layer, encryption, guide, or mosaic component). The relationship information may also be used to determine which decoder(s) 127 and/or 130 may receive the data component for decoding.

When the receiving device 109 identifies a data component, the demultiplexers 403 may route the related data components to the appropriate decoder. For example, as illustrated in FIG. 4, a base layer component may be sent to a legacy decoder 127 to produce, e.g., standard or HD video. An enhanced layer component can include additional information that, when combined with information in the base layer component, may be used by more advanced (or enhanced) decoders to produce enhanced video with a higher resolution, a higher rate, etc. As shown in FIG. 4, the base layer component and one or more enhanced layer components can be routed to an enhanced decoder 130 for decoding. For example, the decoder 130 may be configured to decode a SVC base layer component and one or more SVC enhancement layer components to generate video with higher temporal, spatial, and/or quality resolutions than can be produced from the base layer alone. While the example of FIG. 4 depicts two demultiplexers 403 and two decoders 127 and 130, additional demultiplexers 403 and decoders 127 and/or 130 may be included.

Legacy decoders 127 may also be configured to receive and process related data components. For instance, a related data component including encryption or guide information may be routed to a legacy decoder 127 for use with the base layer component. The legacy and enhanced (or advanced) decoders 127 and 130 may comprise suitable circuitry and/or code executed by hardware included in the circuitry (e.g., a processor) configured to decode the data components and provide the decoded data 406 for rendering or further processing. The demultiplexers 403 and/or decoders 127 and 130 may also include a buffer to store related data components to allow for variations in routing times between the data components. For example, the receiving device 109 may configured to control the routing of related data components from the demultiplexers 403 to coordinate the arrival of the related data components at the decoder 127 or 130. If a delay occurs between related data components reaching the appropriate decoder, the buffer may be utilized to adjust for the delay.

Figure 5:
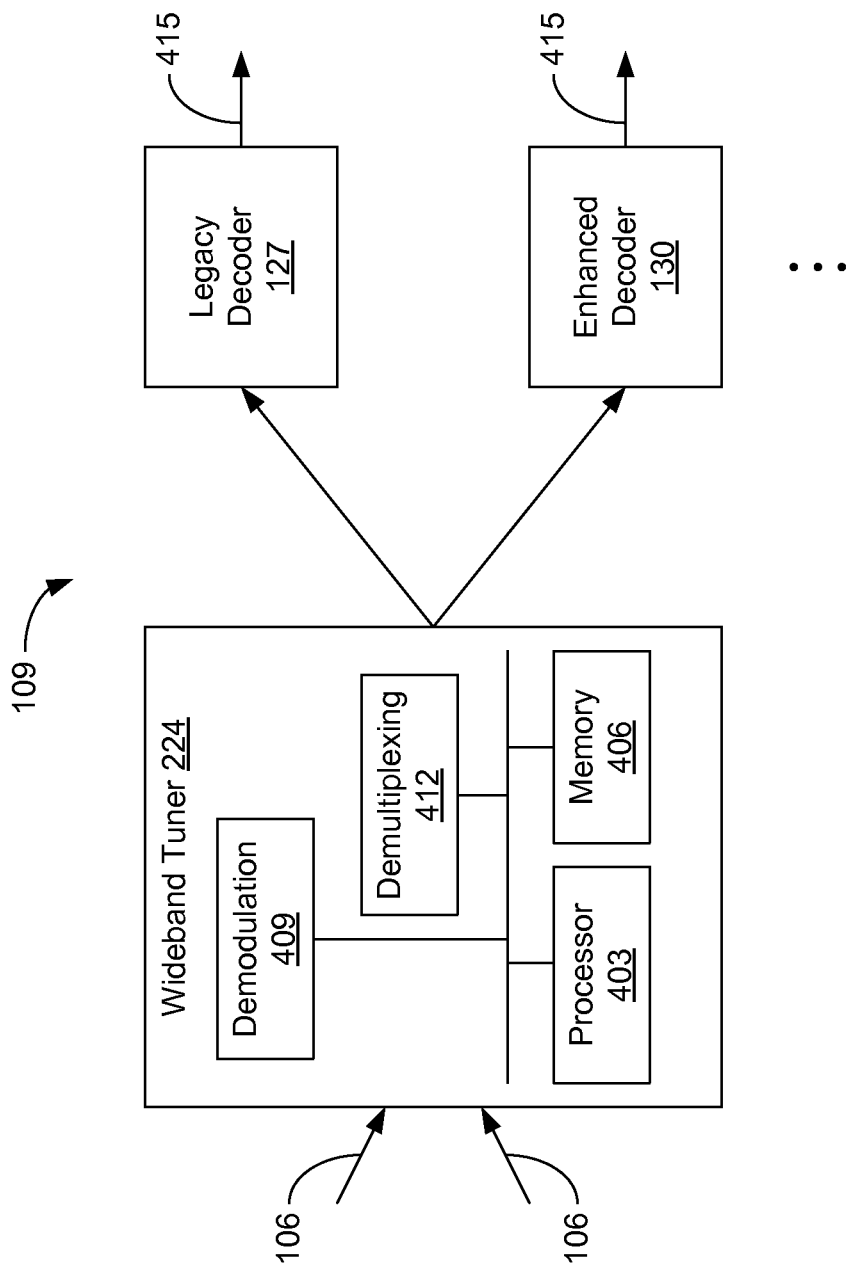
FIG. 5 is a graphical representation of an example of a receiving device of FIG. 2 in accordance with various embodiments of the present disclosure.

Referring next to FIG. 5, shown is an example of a receiving device 109 of FIG. 2 for transmission of related data components across independent streams 106. In the example of FIG. 5, the receiving device 109 includes a wideband tuner 224 and legacy and enhanced decoders 127 and 130. The wideband tuner 224 may comprise suitable circuitry that may include, e.g., processor(s) 403, memory 406, application specific hardware (ASIC), interfaces and/or other components as well as code executed by hardware included in the circuitry (e.g., a processor) that may be configured to receive, process, and distribute the data components received via the multiple transport streams 106. The wideband tuner 224 receives and demodulates 409 the plurality of transport streams 106 including the data components and separates the data components by, e.g., demultiplexing 412. The receiving device 109 is configured to identify related data components based at least in part upon the synchronization tag included in the data component as previously described. In some embodiments, identification of the related data components is carried out by the wideband tuner 224. The wideband tuner 224 distributes the related data components to the appropriate decoder(s) 127 and/or 130, e.g., based upon its capabilities. Related components may be combined by the wideband tuner 224 before distributing the content to the appropriate decoder. In some implementations, related data components from different channels may be simultaneously provided to different decoders for decoding.

Figure 6:
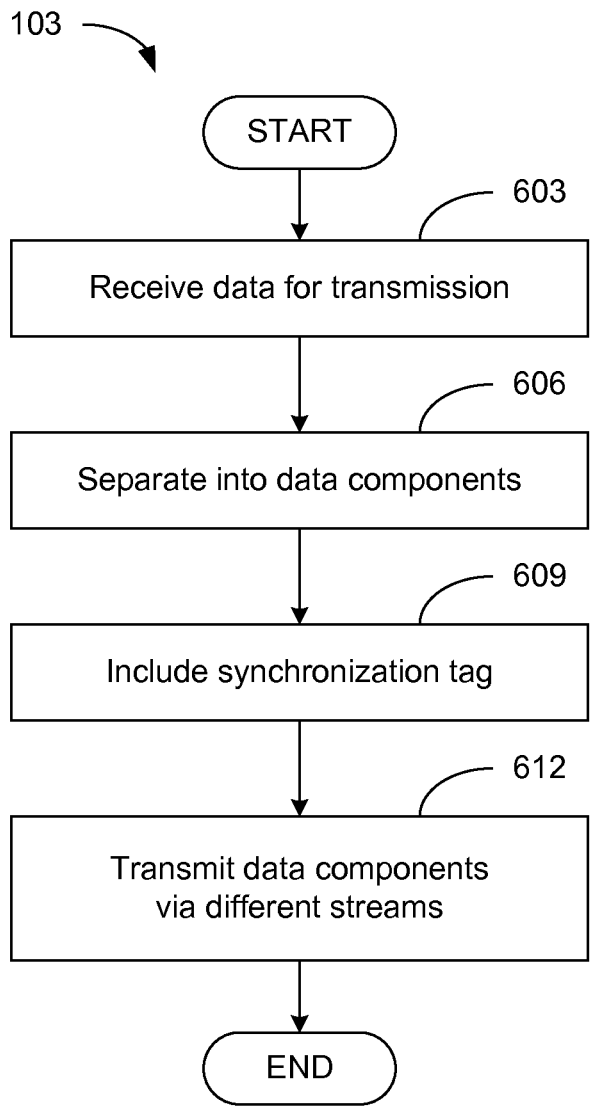
FIGS. 6 and 7 are flowcharts illustrating examples of transmission of related data components across independent streams in accordance with various embodiments of the present disclosure.

Referring now to FIG. 6, shown is a flowchart illustrating an example of transmission of related data components across independent streams in a transmitting device 103. Initially, data is received by the transmitting device 103 for transmission in block 603. The transmission data may include audio, video, and/or other content such as, e.g., channel guides, closed captioning, encryption information, etc. In block 606, the transmission data is separated into related data components for transmission to a receiving device 109 via different streams 106 (FIGS. 1 and 2). For example, HD video content received by the transmission device 103 may be separated into a base layer component and one or more enhanced layer components during encoding for transmission over multiple transport streams 106. In other implementations, related data components may include a video content, audio content, and guide information. Encryption information corresponding to the content of the related data components may also be included as another related data component. In some implementations, mosaic information may be sent over a plurality of transport streams 106. For example, the video content may be divided into smaller video portions that may be transmitted via different transport streams 106. The smaller video portions may be encoded in parallel and sent to the receiving device 109 as related data components.

In block 609, a synchronization tag is included in each of the related data components by the transmitting device 103. The synchronization tag may include, e.g., a time stamp, an offset correction value, a frame identifier, and/or other information that may be used for synchronization of the related data components by the receiving device 109. The related data components are then transmitted in different streams in block 612. The related data components may be merged with other unrelated and/or related data components (e.g., by multiplexing) and modulated for transmission to the receiving device 109. A quadrature amplitude modulation (QAM) or other appropriate modulation of the merged data components may be used.

Figure 7:
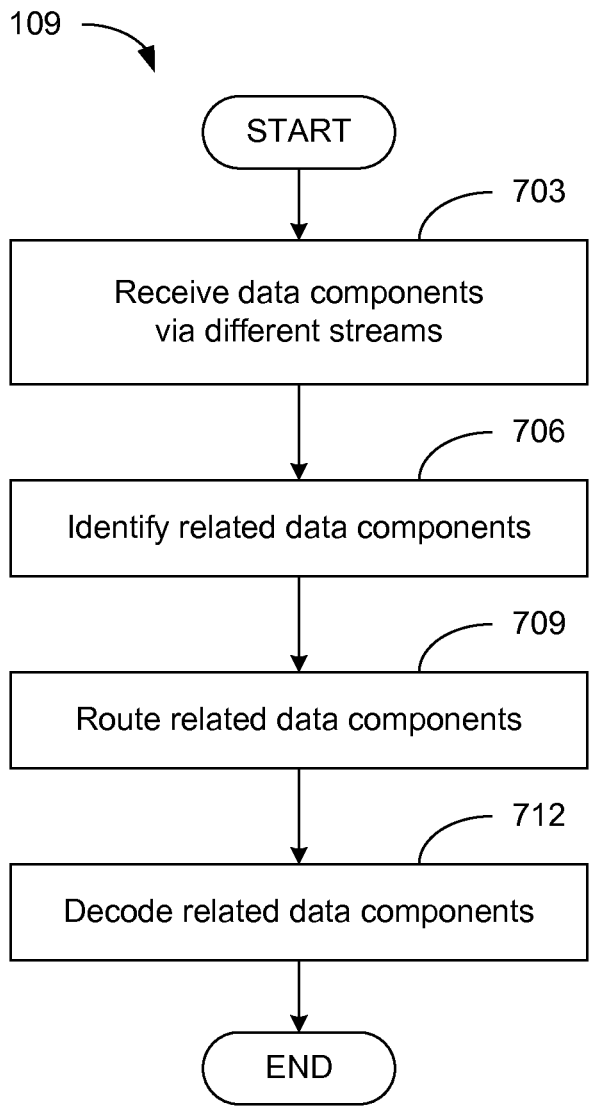

Referring next to FIG. 7, shown is a flowchart illustrating an example of transmission of related data components across independent streams in a receiving device 109. Initially, multiple transport streams 106 including data components are received by the receiving device 109 in block 703. The received transport streams 106 may be demodulated and the separated into the data components by demultiplexing. In some embodiments, the demodulation and demultiplexing may be performed by a multiband tuner 224 of the receiving device 109. In block 706, the data components are identified by the receiving device 109. Related data components may be identified based at least in part upon the synchronization tag included in each of the related data components. The related components from different transport streams 106 are then routed (block 709) to the appropriate decoder for decoding in block 712.

The routing 709 and decoding 712 may be based at least in part upon the synchronization tag. Information such as, e.g., a time stamp, an offset correction value, a frame identifier, and/or other information that may be used for synchronization of the related data components by the receiving device 109. For example, mosaic information sent over a plurality of transport streams 106 may be decoded and recombined to reform a video based at least in part upon the synchronization tag. The smaller video portions may be decoded in parallel and reformed to provide the video data for rendering on a display device. In some cases, encryption information included in a related data component may be used to process the related data component. In addition, the routing may be based upon the capabilities of the decoder. For example, SVC base layer and enhanced layer components may be routed to an enhanced (or advanced) decoder 130 (FIGS. 1 and 2) that may be capable of decoding the video content at higher resolutions. Legacy decoders 127 (FIGS. 1 and 2) that are not capable of utilizing the enhanced layer information may only receive the base layer component. Other related data components including, e.g., channel guide information, closed captioning, encryption information, etc. may also be routed to a legacy decoder 127 and/or an enhanced decoder 130 if they are capable of decoding and providing the content for rendering or processing.

The flow charts of FIGS. 6 and 7 show the functionality and operation of a transmitting device 103 and receiving device 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a transmitting device 103 or receiving device 109. The machine code may be converted from the source code, etc. If embodied in hardware, each block may represent a circuit or a number of interconnected circuits to implement the specified logical function(s).

Although the flow charts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any code or application described herein that comprises software or code can be embodied in any non-transitory computer-readable medium for use by or in connection with an instruction execution system such as, for example, a processor a transmitting device 103 or receiving device 109. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A transmitting device, comprising:
   circuitry configured to separate transmission data into related data components, each related data component associated with one of a plurality of transport streams, each of the related data components related to a first set of one or more channels; and
   circuitry configured to merge the related data components with unrelated data components before transmitting in the associated transport stream, the unrelated data components related to a second set of one or more channels different than the first set of channels; and
   circuitry configured to transmit each related data component in the associated transport stream, each related data component including a synchronization tag associated with synchronization of the related data components within the transmission data.

2. The transmitting device of claim 1, further comprising circuitry configured to include the synchronizing tag in the related data component.

3. The transmitting device of claim 1, wherein the transmission data comprises video content.

4. The transmitting device of claim 3, wherein the video content is separated into a base layer component and at least one enhanced layer component, wherein the base layer component and the at least one enhanced layer component are transmitted in different transport streams.

5. The transmitting device of claim 4, wherein a plurality of enhanced layer components of the video content are transmitted in the same transport stream.

6. The transmitting device of claim 1, further comprising circuitry configured to modulate the related data components at a modulation rate for transmission in the associated transport stream, the modulation circuitry comprising a modulation buffer, wherein the modulation rate is adjusted based at least in part upon a condition of the modulation buffer.

7. The transmitting device of claim 1, wherein the synchronization tag comprises a time stamp.

8. The transmitting device of claim 1, wherein the synchronization tag comprises a frame identifier.

9. A receiving device, comprising:
    circuitry configured to receive a plurality of related data components transmitted in separate transport streams, each related data component including a synchronization tag associated with synchronization of the related data components received in the separate transport streams, each of the related data components related to a first set of one or more channels, the transport streams further including a plurality of unrelated data components merged with the related data components within the transport streams, the unrelated data components related to a second set of one or more channels different than the first set of channels; and
    circuitry configured to decode the plurality of related data components based at least in part upon the synchronization tag.

10. The receiving device of claim 9, further comprising circuitry configured to separate related data components from unrelated data components in the same transport stream based at least in part upon the synchronization tags of the related data components.

11. The receiving device of claim 9, further comprising a wideband tuner configured to separate related data components from unrelated data components in each of a plurality of separate transport streams based at least in part upon the synchronization tag of the related data components.

12. The receiving device of claim 11, wherein the wideband tuner is configured to identify related data components based at least in part upon information in the synchronization tag.

13. The receiving device of claim 9, wherein the synchronization tag comprises a frame identifier.

14. The receiving device of claim 9, wherein the synchronization tag comprises a time stamp.

15. The receiving device of claim 9, wherein the plurality of related data components comprise a base layer component transmitted in a first transport stream and an enhanced layer component transmitted in a second transport stream.

16. The receiving device of claim 15, wherein the base layer component and the enhanced layer component are scalable video coding (SVC) layer components.

17. A method for data transmission across independent streams, comprising
    receiving a plurality of data components transmitted on a plurality of transport streams, each transport stream including related data components and unrelated data components, each related data component including a synchronization tag associated with synchronization of the related data components, each of the related data components related to a first set of one or more channels and each of the unrelated data components related to a second set of one or more channels different than the first set of channels;
    separating the related data components from the unrelated data components in each of the plurality of transport streams based at least in part upon the synchronization tag of each related data component; and
    decoding the related data components based at least in part upon the synchronization tag.

18. The method of claim 17, wherein the synchronization tag comprises a clock offset compensation value.

19. The method of claim 18, wherein the related data components are identified based at least in part upon the clock offset compensation value and a program clock reference (PCR) of the corresponding transport stream.

* * * * *